Aug. 19, 1941.   L. B. BERG   2,253,320
WHEEL
Filed July 1, 1940

Inventor:
Louis B. Berg
By Edward C. Gritzbaugh
Atty.

Patented Aug. 19, 1941

2,253,320

UNITED STATES PATENT OFFICE 2,253,320

WHEEL

Louis B. Berg, Chicago, Ill., assignor to Borg-Warner Corporation, Chicago, Ill., a corporation of Illinois Application July 1, 1940, Serial No. 343,409

2 Claims. (Cl. 152—411)

This invention relates to wheels and particularly to means for retaining a tire on a wheel.

It is frequently necessary in assembling tractors and the like to route the tractors through various divisions or departments of a factory while the tractor is in a semi-finished state. This may be done while the tractor is in a stage of completion where the wheels are already mounted on the tractor, and to simplify the process of moving the tractors about, they are simply rolled on their wheels to their destinations. If the rolling is done before the tires are mounted on the wheel, the ordinary drop center rim will cause deep cuts to be made in the paving in the factory. This of course, is extremely undesirable. If, however, the moving is done with the rubber tires or the like already mounted on the wheels, then the tires may become scuffed or dirty and detract from the appearance of the finished tractor.

The principal object of this invention is to provide a wheel which may be used to support an implement while the implement is without tires, the wheel having a broad flat surface without sharp edges so that contact with relatively soft pavement does not mar the surface thereof.

Another important object of this invention is a tire-retaining means to be used with a wheel having a broad cylindrical surface, the retaining means being simple and self-locking.

Other objects and features of this invention will become apparent from the following description when taken together with the accompanying drawing in which.

In its preferred form, this invention comprises a wheel having a felly in the shape of an inverted channel, with the back of the channel serving as a broad cylindrical surface upon which the wheel may be rolled prior to the addition of the tire thereto. The tire is retained upon the wheel by means of side rings which are removable by movement in an axial direction. The rings are retained upon the felly by means of lugs which are U-shaped, with one of the legs of the U shorter than the other and passing through one of a plurality of apertures in the side of the felly to form a lock therewith. The pressure of the air in the tire is used to maintain the lugs in locked position.

Figure 1:
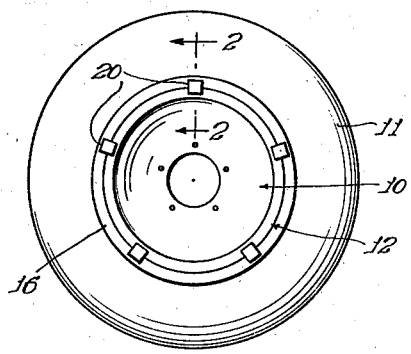
Fig. 1 is a side elevation of a wheel showing a tire mounted thereon.
Figure 2:
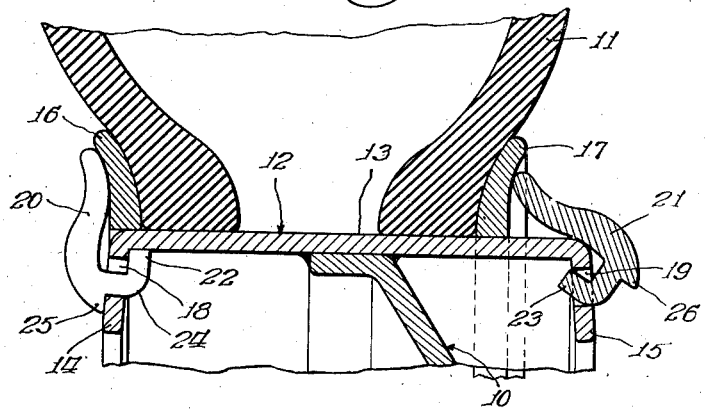
Fig. 2 is a fragmentary front elevation in section showing the contour of the wheel and the manner in which the tire is retained upon the wheel.
Figure 3:
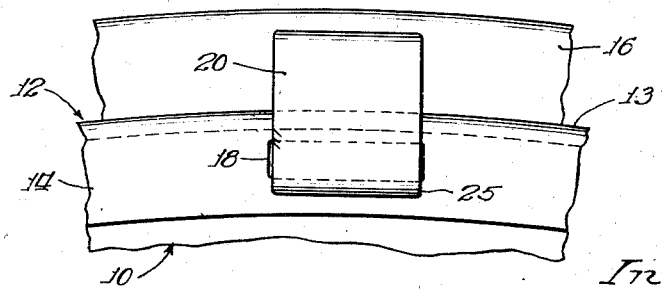
Fig. 3 is an enlarged fragmentary side elevation of one of the fastening means for the tire retaining means.

Referring to the drawing now for a more detailed description of the invention, the wheel 10 is shown in Fig. 1 with a tire 11 mounted thereon. The wheel 10 is provided with a felly 12 which is shown more clearly in cross-section in Fig. 2. Said felly 12 is in the form of an inverted channel having a broad cylindrical surface 13 and side flanges 14 and 15. Said wheel 10 may be of any form such as disc or spoke, and may be secured to felly 12 by welding or otherwise, care being taken to prevent the formation of protuberances by the fastening means.

Tire 11 is preferably, although not necessarily, of the inflatable type, it merely being necessary for the operation of this invention that the tire be resilient in an axial direction. Said tire 11 fits over felly 12 in contact with surface 13 and is retained on the felly by removable side rings 16 and 17. Said rings 16 and 17 are likewise adapted to fit over felly 12 in contact with surface 13, ring 16 being used to maintain the left wall (Fig. 2) of the tire upon the felly, and ring 17 being used to maintain the opposite wall in place on the felly.

Side flanges 14 and 15 are provided with apertures 18 and 19, respectively, into which are passed lugs 20 and 21, respectively. Said lugs are U-shaped in cross section with one of the legs of the U shorter than the other so that the longer leg extends radially outwardly beyond the edge of the felly to contact the side rings. Thus, lug 20 is provided with a short leg 22 which extends upwardly on the inside of the channel beyond the outer edge of aperture 18 and similarly lug 21 is provided with a short leg 23 which is identical in shape and purpose with leg 22 of lug 20. As shown in Fig. 1, a plurality of lugs is provided for each side ring.

It will be apparent from lug 20 that axial pressure upon side ring 16 will tend to move lug 20 axially along felly 12. This, however, is prevented by leg 22 which abuts against the inside of flange 14, and thereby prevents further axial movement in that direction. In order to insert leg 22 in aperture 18, however, it is necessary that aperture 18 be of sufficient size to accommodate the corner 24 of the lug. This being so, there might be a tendency for lug 20 to continue rotating until the bottom of the lug abutted against the inner edge of aperture 18. This action of course, would be rather indeterminate, and for this reason lug 20 is provided with an abutment 25 which definitely limits the rotative movement of the lug with respect to flange 14.

To illustrate the turning movement of the lugs prior to locking against the side flanges, lug 21 is shown in a partially engaged position. It will be observed that side ring 17 is moved axially inward toward the center of the felly to permit the short leg 23 to enter aperture 19. After short leg 23 passes through aperture 19, lug 21 may then be rotated in a clockwise direction until it abuts the inside of flange 15. The lug is so designed that at about this point abutment 26 on lug 21 strikes the outside of flange 15, thereby preventing further rotative or axial movement of the lug.

Tire 11 would normally tend to assume a shape which is very nearly the shape it will take in its inflated form. This tendency to assume its designed shape will cause ring 17 to move axially with lug 21 as it is rotated. The inflation of the tire to its recommended pressure will securely lock lugs 20 and 21 on their respective side flanges 14 and 15, and will prevent further spreading of side rings 16 and 17.

It is thus apparent that wheel 10 may be rolled on its felly without marring the pavement upon which it is rolled and that tire 11 need not be mounted on the felly until the implement is completely assembled or even until after it is delivered so that there is less opportunity for soiling or scuffing the tires prior to the delivery of the implement to the purchaser. It is also apparent that the removal of the tire from felly 12 is a comparatively simple matter, since it is not necessary to fold the tire over side rings 17. All that is necessary is to deflate the tire, rotate one set of lugs 21 out of locking position and then pull the associated ring axially off the felly. The tire may then be withdrawn in the same direction merely by sliding it over the felly. To replace a tire, one ring and its retaining lugs is first mounted on the felly, the tire is then slid over the wheel and then the second ring is slid over the wheel, the locking lugs being inserted in the openings provided therefor and rotated to locking position.

It is understood that the foregoing description is merely illustrative of a preferred embodiment of this invention, and that the scope of the invention therefore is not to be limited thereto, but is to be determined by the appended claims.

I claim:

1. A wheel having a substantially flat surface on its outer periphery upon which it may be rolled, a removable resilient tire adapted to fit over the flat surface to provide traction for the wheel in soft earth, removable side rings on the flat surface for retaining the tire on the wheel and lugs on the wheel and cooperating with the rings to retain the tire on the wheel, said wheel having radially disposed regions with slots therein, and said lugs being substantially U-shaped with one leg of the U shorter than the other, said short leg passing through the slot in the side region and locking against the side region by the pressure exerted by the tire against the cooperating side ring.

2. A wheel as described in claim 1, said lugs having abutments cooperating with the outside of the radially disposed regions to limit the movement of the lugs with respect to said regions.

LOUIS B. BERG.